United States Patent [19]

Furusawa et al.

[11] Patent Number: 4,677,879

[45] Date of Patent: Jul. 7, 1987

[54] TRANSMISSION FOR FOUR-WHEEL DRIVE VEHICLES

[75] Inventors: Choji Furusawa, Toyota; Toshiaki Ishiguro, Nagoya, both of Japan

[73] Assignee: Aisin Seiki Kabushiki Kaisha, Aichi, Japan

[21] Appl. No.: 622,148

[22] Filed: Jun. 19, 1984

[30] Foreign Application Priority Data

Jun. 20, 1983 [JP] Japan .................... 58-109259
Jun. 20, 1983 [JP] Japan .................... 58-109258

[51] Int. Cl.$^4$ ........................... B60K 41/04
[52] U.S. Cl. ........................... 74/866; 74/867; 74/752 A
[58] Field of Search ............ 74/740, 856, 858, 866, 74/867, 869, 752 A, 752 C, 752 D, 665 F, 732, 733; 364/424.1; 180/244, 247

[56] References Cited

U.S. PATENT DOCUMENTS

| | | | |
|---|---|---|---|
| 2,923,175 | 2/1960 | Perkins | 74/740 |
| 4,089,239 | 5/1978 | Murakami et al. | 74/759 X |
| 4,274,306 | 6/1981 | Yokoi et al. | 74/866 |
| 4,312,248 | 1/1982 | Sugimoto et al. | 74/866 |
| 4,324,153 | 4/1982 | Sugimoto | 74/866 |
| 4,367,528 | 1/1983 | Kawamoto | 364/424.1 |
| 4,480,505 | 11/1984 | Takano et al. | 74/866 |
| 4,503,927 | 3/1985 | Hayakawa et al. | 74/752 A X |
| 4,508,190 | 4/1985 | Uchiyama | 180/247 |
| 4,512,212 | 4/1985 | Ishikawa | 74/732 |
| 4,527,447 | 7/1985 | Richards | 74/866 |

FOREIGN PATENT DOCUMENTS 0143413 8/1980 Fed. Rep. of Germany ........ 74/866

Primary Examiner—Allan D. Herrmann
Assistant Examiner—David Novais
Attorney, Agent, or Firm—Burns, Doane, Swecker & Mathis

[57] ABSTRACT

An apparatus for controlling a transmission comprises a power transmission assembly for transmitting power from an engine, an input member connected to an output side of the power transmission assembly, a first power train connected to the input member and having at least two different speed-change ratios, a second power train communicating with the first power train and including a dog clutch for cutting off or changing over power, a brake assembly for locking the input member, and a clutch assembly for engaging and disengaging the input member with the first power train. A control system is provided for engaging the brake assembly in response to a signal indicative of changing-over of the second power train when the clutch assembly is in the disengaged state.

7 Claims, 9 Drawing Figures

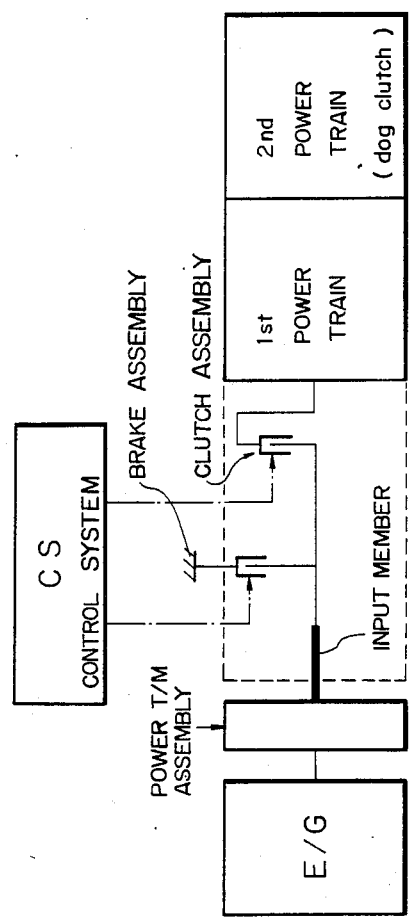

TRANSMISSION FOR FOUR-WHEEL DRIVE VEHICLES

BACKGROUND OF THE INVENTION

This invention relates to a transmission mechanism and a control apparatus therefor and, more particularly, to a control apparatus for a transmission having a power transmission assembly for transmitting power from an engine, a first power train coupled to the power transmission assembly and having at least two different speed-change ratios, and a separate second power train communicating with the first power train and including a dog clutch for cutting off or switching over power.

A transmission of the foregoing type known in the art makes use of a hydraulic power transmission unit (e.g., a torque converter) as the power transmission assembly, a gear ratio transmission element, which includes a planetary gear set or sets, as the first power train, and a dog clutch-type power distributing unit (e.g., a transfer assembly for four-wheel drive vehicles, or a power take-off assembly for specialized vehicles) as the second power train. Recently, attempts have been made to automate transmission control in such transmissions, particularly those having the transfer assembly for four-wheel drive vehicles. By way of example, it has been attempted to change over the transfer section by switching gears and to effect a speed change by an automatic transmission having a planetary gear. However, with a transmission of this type, when the shaft position is in the N (neutral) range, the output shaft rotates owing to a dragging torque developed by, e.g., a clutch in the automatic transmission even though it is attempted to change over the transfer section. As a result, changing-over the transfer section becomes sluggish and it is difficult to the transfer assembly (dog clutch) in mesh.

SUMMARY OF THE DISCLOSURE

Accordingly, an object of the present invention is to provide a transmission for four-wheel drive vehicles which is devoid of the foregoing drawback encountered in the prior art.

According to the first aspect of the present invention, the foregoing object is attained by providing an apparatus for controlling a transmission, particularly for a four-wheel drive vehicle, comprising a power transmission assembly for transmitting power from an engine, an input member connected to an output side of the power transmission assembly, particularly, a fluid coupling, a first power train connected to the input member and having at least two different speed-change ratios, a second power train operatively communicating with the first power train and including a dog clutch for cutting off or changing over power, a brake assembly for locking the input member, and a clutch assembly for operatively engaging and disengaging the input member with the first power train, —wherein means is provided for engaging the brake assembly in response to a signal indicative of the changing-over of the second power train when the clutch assembly is in the disengaged state.

According to the second aspect of the present invention, a transmission mechanism with transfer assembly is provided including:

(a) a power transmission assembly for transmitting power from an engine;
(b) an input member connected to an output side of the power transmission assembly;
(c) a first power train connected to the input member including:
  (d) a gear ratio tansmission mechanism including at least 3 rotary elements of an input element, an output element and a reaction element, the gear ratio transmission mechanism being connected to said input member,
  (e) a casing as a stationary member,
  (f) an output member connected to said gear mechanism,
  (g) a brake assembly for locking said input member to said casing, and
  (h) friction engaging means, for establishing a predetermined power train between said input member (b) and said output member (f), provided with:
    (h-1) a clutch assembly for engaging and disengaging at least one of said rotary elememts with said input member (b),
    (h-2) another clutch assembly for engaging and disengaging other one of the rotary elements with said input member (b), and
    (h-3) another brake assembly for locking and unlocking said another one of the rotary elements to and from said casing (e); and
(i) a second power train comprised of a transfer assembly including:
  a transfer input shaft connected to said output member of the first power train,
  at least a transfer output shaft, and
  a dog clutch for cutting-off or transmitting power between said transfer input and output shafts.

The term "dog clutch" herein is used in the broadest sense encompassing shape-to-shape engaging clutches two members of which mesh each other like gears, mechanical couplings or the like.

The term "rotary element" hereinabove means a rotationally integral unit of rotary members which rotates as a solid body, for instance, such as a set of a pinion gear(s) and a carrier in a planetary gear set.

The gear mechanism in the first power train is preferably comprised of a planetary gear set(s). Upon power-changing over in the transfer assembly (2nd power train), the clutch assemblies and brake assemblies are selectively engaged and/or disengaged so as to lock the output torque from the first power train resulting in an idle state of the output member thereof. Thus the transfer assembly can be changed over smoothly and easily.

The preferred embodiments of the present invention provides a control apparatus including an electric or computerized control system with a corresponding hydraulic system, however, the entire system may be hydraulically composed.

In the transmission of the above-described construction, as the signal indicative of the state of the second power train a changing-over signah is generated when the second power train, namely the dog clutch of the transfer section, is about to be changed over with the clutch assembly in the disengaged state. The brake assembly is engaged in response to the changing-over signal. In consequence, power is not transmitted to an output member of the first power train and a freed state is established. The dog clutch therefore is changed over in a smooth manner, eliminating the problem encountered in the prior art.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a block diagram illustrating a general concept of the present invention.

DETAILED DISCLOSURE OF THE PREFERRED EMBODIMENTS

Reference will now be had to the accompanying drawings to describe preferred embodiments of the present invention.

Figure 1:
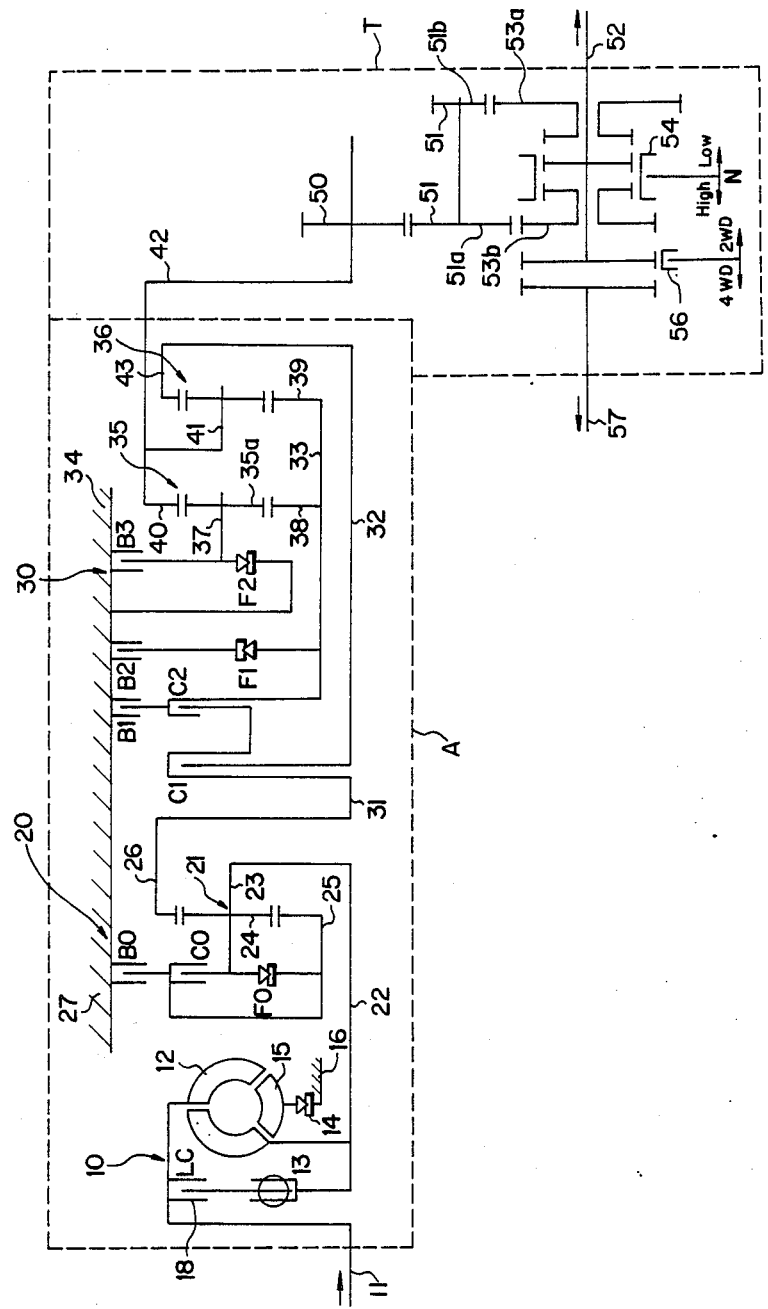
FIG. 1 is a schematic diagram illustrating a transfer-equipped transmission according to the present invention.

As shown in FIG. 1, a transmission in accordance with the present invention comprises a power transmission assembly/first power train unit A and a transfer section T (second power train).

The unit A comprises a torque converter 10 as the power transmission assembly, and as the first power train an overdrive mechanism 20, and a planetary transmision mechanism 30 having three forward speeds and one reverse speed. The unit A is controlled by a control apparatus CS of the kind shown in FIG. 2B. The torque converter 10, which is of a well-known construction, comprises a pump wheel 12 connected to an engine output shaft 11, a turbine wheel 13 connected to the overdrive mechanism 20 against the pump wheel 12, and a stator 15 connected to a housing 16 via a one-way clutch 14. Disposed between the input and output shafts is a lock-up clutch 18 capable of providing a direct connection.

The overdrive mechanism 20 includes one planetary gear set 21. The planetary gear 21 comprises a planetary pinion 24 rotatably supported on a carrier 23 which is connected to the torque converter via a shaft 22, as well as a sun gear 25 and ring gear 26 each of which meshes with the pinion 24. Provided between the sun gear 25 and carrier 23 are a multiple-disk clutch CO and a one-way clutch FO. A multiple-disk brake BO is provided between the sun gear 25 and the housing or overdrive casing 27 enclosing the overdrive mechanism 20.

The ring gear 26 of the overdrive mechanism 20 is connected to an input shaft 31 of the planetary transmission mechanism 30 having three forward speeds and one reverse speed. A multiple-disk clutch C1 is provided between the input shaft 31 and an intermediate shaft 32, and a multiple-disk clutch C2 is provided between the input shaft 31 and a sun gear shaft 33. Provided between the sun gear shaft 33 and a transmission casing 34 are a multiple-disk brake B1, a multiple-disk brake B2, and a one-way clutch F1. The planetary mechanism 30 includes two planetary gears sets 35, 36. A multiple-disk brake B3 and a one-way clutch F2 are provided between the transmission casing 34 and a carrier 37 rotatably supporting a pinion 35a of the second planetary gear set 35. A sun gear 38 of the second planetary gear set 35 and a sun gear 39 of the third planetary gear set 36 are interconnected via a shaft 33. A ring gear 40 of the second planetary gear set 35 and a carrier 41 of the third planetary gear set 36 are interconnected by an output shaft 41. A ring gear 43 of the third planetary gear set 36 is connected to the intermediate shaft 32.

The transfer section T includes an input gear 50 connected to the output shaft 42 of the planetary gear mechanism 30, an intermediate gear pair 51 meshing with the input gear 50, and an output gear pair 53a and 53b rotatably disposed on a rear propeller shaft 52. The intermediate gear pair 51 and output gear pair 53a and 53b have integrated large and small gears 51a, 51b, 53a, 53b of the same number of teeth, with the gears meshing in the manner illustrated. The rear propeller shaft 52 is provided with a dog clutch 54 for connecting the propeller shaft 52 to either the large 53a or small gear 53b of the output gear pair 53. A high gear ratio is achieved when the rear propeller shaft 52 is connected to the small gear 53b by the dog clutch 54, and a low gear ratio when the propeller shaft is connected to the large gear 53a by the dog clutch. The neutral gear position is achieved when the propeller shaft 52 is connected to neither of the gears 53a, 53b. A front propeller shaft 57, which is centered on the rear propeller shaft 52, is not connected to the rear propeller shaft 52 at all times. When a connection is established between the front propeller shaft 57 and rear propeller shaft 52 by a dog clutch 56 on the shaft, the vehicle is placed in four-wheel drive.

The unit A, under the control of the control apparatus CS described in detail below, engages or disengages the various clutches and brakes in accordance with engine output and vehicle speed, and effects a speed change in four forward speeds including overdrive (O/D), or in one reverse speed by automatic or manual shifting. The transfer section T is changed over by a conventional lever operation. Transmission gear position and the operating states of the clutches and brakes are as shown in Table 1, in which the circles indicate that the particular clutch or brake is in the engaged state.

TABLE I

| SPEED | | C0 | C1 | C2 | B0 | B1 | B2 | B3 |
|---|---|---|---|---|---|---|---|---|
| P | | 0 | | | | | | 0 |
| R | | 0 | | 0 | | Δ | | |
| N | | 0 | | | Δ | | | |
| D | 1st | 0 | 0 | | | | | ⊙ |
| | 2nd | 0 | 0 | | | 0 | 0 | |
| | 3rd | 0 | 0 | 0 | | | 0 | |
| | 4th | | 0 | 0 | 0 | | 0 | |
| 3 | 1st | 0 | 0 | | | | | |
| | 2nd | 0 | 0 | | | | | |
| | 3rd | 0 | 0 | 0 | | | 0 | |
| L | 1st | 0 | 0 | | | | | 0 |

Figure 2A:
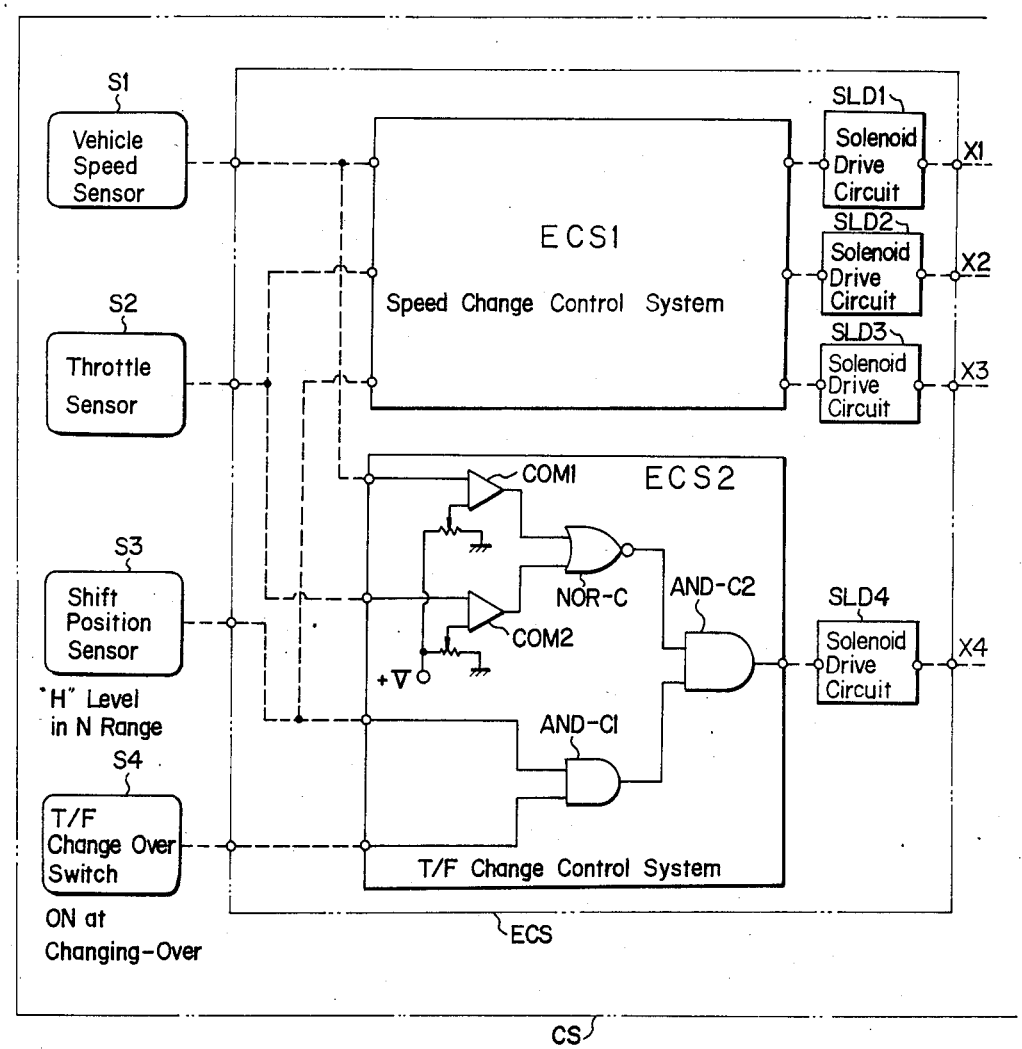
FIG. 2A is a block diagram of an electronic control apparatus for selectively actuating a clutch and brake in the transmission shown in FIG. 1.
Figure 2B:
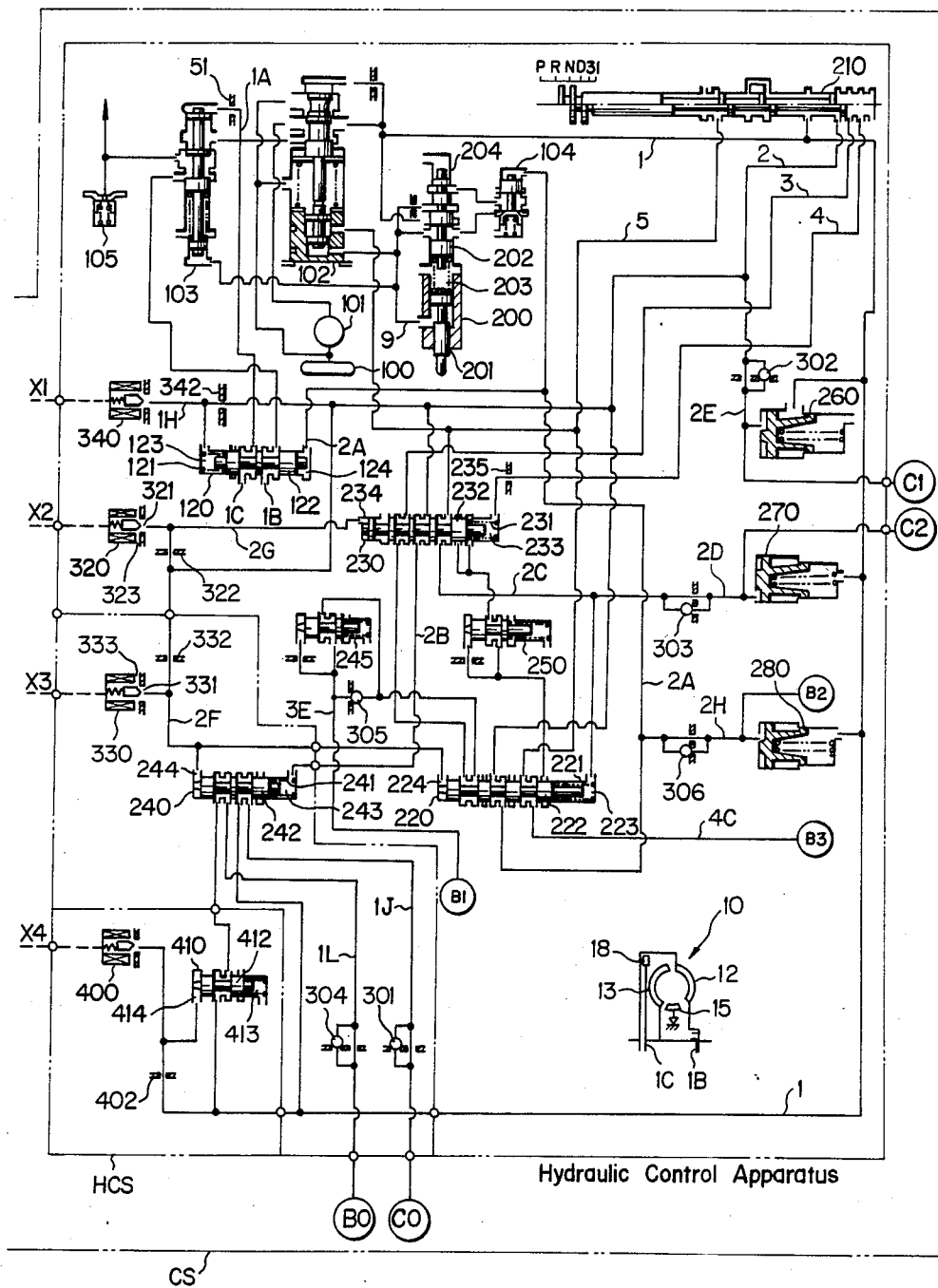
FIG. 2B is a schematic diagram of a hydraulic control apparatus for selectively actuating a clutch and a brake in the transmission shown in FIG. 1.

FIGS. 2A and 2B shows an embodiment of the control apparatus CS for selectively actuating the clutches C0, C1, C2 and brakes B0, B1, B2, B3 to effect a transmission operation automatically or manually.

The control apparatus CS shown in FIG. 2B comprises a hydraulic control apparatus HCS for hydraulically controlling the servo mechanisms of the various clutches and brakes of the unit A, and in FIG. 2A, an electrical control apparatus ECS for controlling various solenoid valves 320, 330, 340, 400 of the hydraulic control apparatus HCS. The electrical control apparatus ECS comprises a speed change control system ECS1 responsive to a vehicle speed sensor S1, a throttle sensor S2 and a shift position sensor S3, as well as a transfer change control system ECS2 responsive to the shift position sensor S3 and a transfer changeover switch S4.

The hydraulic control apparatus HCS comprises an oil reservoir 100, an oil pump 101, a first pressure regulating valve 102, a second pressure regulating valve 103, a cut-back valve 104, a cooler by-pass valve 105, a lock-up clutch control valve 120, a throttle valve 200, a manual valve 210, a 1-2 shift valve 220, a 2-3 shift valve 230, a 3-4 shift valve 240, an intermediate-coast modulator valve 245 for regulating hydraulic pressure fed to the brake B1, a low-coast modulator valve 250 for regulating hydraulic pressure fed to the brake B3, an accumulator 260 for smoothly engaging the clutch C1, an accumulator 270 for smoothly engaging the clutch C2, an accumulator 280 for smoothly engaging the brake B2, check valves 301, 302, 303, 304, 305, 306, for controlling outflow of hydraulic pressure fed to the clutches C0, C1, C2 and brakes B1, B2, B3, the first solenoid valve 320 for controlling the 2-3 shift valve, the second solenoid valve 330 for controlling both the 1-2 and 3-4 shift valves, the third solenoid valve 340 for controlling the lock-up clutch control valve 120, the fourth solenoid valve 400 for cotrolling a valve 410, these solenod valves being opened and closed by the outputs of an electrical circuit described below, and an oil passage interconnecting the valves and the hydraulic cylinders of the clutches and brakes. Working oil drawn up from the oil reservoir 100 by the oil pump 101 is supplied to the oil passage upon being regulated to a predetermined pressure (line pressure) by the pressure regulating valve 102. Hydraulic pressure supplied to the second pressure regulating valve 103 via a hydraulic passage 1A communicating with the oil passage 1 is regulated to a requisite torque converter pressure, lubricating oil pressure and cooler pressure in accordance with throttle pressure delivered by the throttle valve 200. The manual valve 210 communicated with the oil passage is connected to a shaft bar provided at the driver's seat. By manual operation, the manual valve 210 is moved to P (park), R (reverse), N (neutral), D (drive), 3 (third) and L (low) positions in accordance with the range of the shift bar. Table II illustrates the state of communication between the oil passage 1 and oil passages 2 through 5 for each of the shift ranges of the shift lever. The circles indicate where line pressure is supplied by establishing communication, while the X-marks indicate exhausted states.

TABLE II

|  | P | R | N | D | 3 | L |
| --- | --- | --- | --- | --- | --- | --- |
| Oil Passage 2 | X | X | X | 0 | 0 | 0 |
| Oil Passage 3 | X | X | X | X | 0 | 0 |
| Oil Passage 4 | X | X | X | X | X | 0 |
| Oil Passage 5 | X | 0 | X | X | X | X |

When the first solenoid valve 320 for controlling the 2-3 shift valve 230 is deenergized, a valve port 321 is closed to produce a high-level solenoid pressure (equal to line pressure) in oil passage 2G communicated with the oil passage 2 via an orifice 322. When the first solenoid 320 is energized, the valve port 321 is opened to discharge the pressure in the oil passage 2G from an oil discharge port 323, thereby producing a low-level solenoid pressure. When the second solenoid valve 330 for controlling the 1-2 shift valve 220 and 3-4 shift valve 240 is deenergized, a valve port 331 is closed to produce a high-level solenoid pressure in oil passage 2F communicated with the oil passage 2 via an orifice 332. When the second solenoid 330 is energized, the valve port 331 is opened to discharge the pressure in the oil passage 2F from an oil discharge port 333, thereby producing a low-level solenoid pressure. Table III illustrates the relation between the energized (0) and deenergized (X) states of the solenoid valves 320, 330, controlled by the electrical circuit described below, and the gear positions of an automatic transmission.

TABLE III

|  | P | R | N | D | | | | 3 | | | L | |
| --- | --- | --- | --- | --- | --- | --- | --- | --- | --- | --- | --- | --- |
|  |  |  |  | 4 | 3 | 2 | 1 | 3 | 2 | 1 | 2 | 1 |
| 320 | X | X | X | X | 0 | 0 | X | 0 | 0 | 0 | 0 |
| 330 | X | X | X | X | 0 | 0 | X | 0 | 0 | X | 0 | X |

The third solenoid valve 340 for controlling the lock-up control valve 120 is provided in an oil chamber 121 at the left end of the lock-up valve 120 communicating with an oil passage 1H, which is communicated with the oil passage 1 via an orifice 342. When the solenoid valve 340 is deenergized, a high-level solenoid pressure is produced in the oil chamber 121, whereby and by a spring 123 backing a spool 122 the spool 122 is urged to the right in the drawing, thereby positioning the spool 122 to the right in the drawing. When the solenoid valve 340 is energized, the oil chamber 121 is depressurized to give rise to a low-level solenoid pressure.

The 1-2 shift valve 220 is equipped with a spool 222 backed on the right side by a spring 221. When the solenoid valve 330 is deenergized to produce a high-level solenoid pressure in the oil passage 2F, the high-level solenoid pressure is introduced to a left-end oil chamber 224. Owing to the applied hydraulic pressure, the spool 222 is set to the right side to establish the first speed position. When the solenoid valve 330 is energized to depressurize the oil chamber 2 and produce a low-level solenoid pressure, the spool 222 is set to the left side and the second speed position is established. In the third and fourth speeds, line pressure is introduced to a right end oil chamber 223 from the oil passage 2C via the manual valve 210 and 2-3 shift valve 230, so that the spool 222 is positioned to the left side regardless of the solenoid pressure.

The 2-3 shift valve 230 is equipped with a spool 232 backed on the right side by a spring 231. When the solenoid valve 320 is energized to produce a low-level solenoid pressure in the oil passage 2G, a spool 232 is set to the left side by the action of the spring 231, thereby establishing the first and second speed positions. When the solenoid valve 320 is deenergized to produce a high-level solenoid pressure in the oil passage 2G, the high-level pressure is applied to an oil chamber 234, whereby the spool 232 is set to the right side by the action of the solenoid pressure. This establishes the third and fourth speed positions. When line pressure is supplied to the oil passage 4, the line pressure is fed into a right-end chamber 233, whereby the spool 232 is locked on the left side, which is the side of the first and second speeds.

The 3-4 shift valve 240 is equipped with a spool 242 backed on one side by a spring 241. In the first and second speeds where the solenoid 330 is deenergized, a high-level solenoid pressure in introduced to a left-end oil chamber 244 via the oil passage 2F, whereby the spool 242 is set to the right side, namely the fourth speed (overdrive) side. When the solenoid 330 is energized to depressurize the oil passage 2F and produce a low-level hydraulic pressure, the spool 242 is set to the left side by the action of the spring 241. In the fourth speed, the solenoid valve 330 is deenergized to set the spool 242 to the right side. When line pressure is supplied to a right-end oil chamber 243 through the manual valve 210, oil passage 2, 2-3 shift valve 230 and oil passage 2B, the spool 242 is locked on the left side (third speed side) in the drawing by the action of the line pressure and spring 241.

As regards the throttle valve 200, a throttle plunger 201 is moved through a stroke in accordance with the amount an accelerator pedal is depressed, thereby moving a spool 202 via a spring 203 disposed between the plunger 201 and the spool, which is backed by a spring 204. As a result, line pressure supplied from the oil passage 1 is delivered to an oil passage 9 upon being regulated to throttle pressure which conforms to the degree of the throttle opening.

When the manual valve 210 has been shifted to the N range, the oil passage 1 is not communicated with any of the oil passages 2 through 5, as shown by Table II, and both of the first and second solenoid valves 320, 330 are deenergized. Accordingly, the spools of the 1-2 shift valve 220, 2-3 shift valve 230 and 3-4 shift valve are all positioned on the left side by the action of the corresponding springs. Only the clutch C0 directly communicating with the oil passage 1 through the 3-4 shift valve 240 and oil passage 1J, and not through the manual valve 210, is engaged.

When the manual valve 210 is shifted to the D range, hydraulic pressure is supplied to the oil passage 2, as shown by Table II, whereby line pressure is supplied through a check valve 302 and oil passage 2E to engage the clutch C1. When traveling in the first speed, the solenoid valve 320 is energized and the solenoid valve 330 deenergized, as shown in Table III, the spool 222 of the 102 shift valve 220 is on the right side, the oil passages 3E, 2A connected to the brakes B1, B2 are depressurized, and the oil passage 4C connected to the brake B3 also is not supplied with hydraulic pressure. Consequently, brakes B1, B2, B3 are in the disengaged state. When the vehicle speed reaches the preset value, the solenoid valve 330 is energized by the output of the electrical control apparatus ECS, and the solenoid pressure applied to the oil chamber 224 drops to a low level. As a result, the spool 222 of the 1-2 shift valve 220 is moved to the left and hydraulic pressure is supplied via the oil passage 2, 1-2 shift valve 220, oil passage 2A, check valve 306 and oil passage 2H, whereby the brake B2 is engaged to effect a shift to second speed. To shift up to third speed, the solenoid 320 is deenergized by a computer output when, e.g., vehicle speed and throttle opening attain predetermined values. This moves the spool 232 of the 2-3 shift valve 230 to the left to supply hydraulic pressure via the oil passage 2, 2-3 shift valve 230, oil passsge 2C, check valve 303, oil passage 2C and oil passage 2D, thereby engaging the clutch C2. At the same time, the spool 222 of the 1-2 shift valve 220 is locked at the left side (second speed side) by line pressure fed into the right end oil chamber 223 from the oil passage 2. This effects the up-shift to third speed. To shift up to fourth speed, the solenoid 330 is deenergized by a computer output when the foregoing conditions are met, whereby the solenoid pressure supplied to the right end oil chamber 243 drops to a low level so that the spool 242 of the 3-4 shift valve moves to the right side to depressurize oil passage 1J and supply hydraulic pressure to oil passage 1L. This releases clutch C0 and engages brake B0.

When the manual valve 210 is in the third range, line pressure is supplied to oil passage 3 in addition to oil passage 2, as shown in Table II. For the first, second and third speeds, shifting similar to that for the D range takes place. However, there is no shift to fourth speed since the spool 242 is locked on the left side by line pressure applied to the right end chamber 243 of the 3-4 shift valve 242 via oil passages 3, 2B. Where a D-3 shift is performed while the vehicle is traveling in fourth speed as the manual valve 210 is in the D position, a down-shift to third speed is effected immediately by introduction of line pressure to the right end oil chamber 243, as set forth above.

When the manual valve 210 is in the L range, line pressure is supplied to oil passsage 4 in addition to oil passages 2 and 3. Operation for first speed is the same as when the manual gear is in the D range. For second speed, the arrangement is such as to apply engine braking by introducing hydraulic pressure to the oil passage 4, whereby brake B3 is engaged via oil passage 4, 2-3 shift valve 230, oil passage 4A, low-coast modulator valve 250, oil passage 4B, 1-2 shift valve 220 and oil passage 4C. When a manual shift is made to the second range while the vehicle is traveling in the third speed, an output produced at the instant of deceleration down to a predetermined speed energizes the solenoid valve 320 to effect a 3-2 down-shift.

When the manual valve 210 is shifted to each of the D, 3 and L ranges to produce line pressure in the oil passage 2 and the 1-2 shift valve 220 is locked on the second speed side (left side), line pressure is produced in the oil passage 2A and supplied to the right-end chamber 124 of the lock-up control valve 120. When the third solenoid valve 340 is energized owing to line pressure to produce a low-level hydraulic pressure in the left-end oil chamber 123, the spool 122 of the lock-up control valve 120 is moved to the left side, oil passages 1A and 1B are communicated, and the lock-up clutch 18 provided in the torque converter 10 is engaged, whereby the torque converter 10 is placed in the lock-up state. When the solenoid valve 340 is deenergized and a high-level solenoid pressure is produced in the oil chamber 123, whether or not line pressure is developed in the oil passsage 2A, the spool 122 is positioned on the bottom side by the action of spring 123 or of spring 123 and the high-level solenoid pressure. With the spool 122 positioned at the bottom side, the oil passage 1A is communicated with the oil passage 1C and the torque converter lock-up clutch 18 is disengaged. The solenoid valve 340 is energized by the electrical control circuit ECS, described below, when the vehicle speed and throttle opening attain set values.

The speed change control system ECS1 of the electrical control apparatus ECS is responsive to outputs from the vehicle speed sensor S1, throttle sensor S2 and shift position sensor S3 to selectively open and close the solenoid valves 320, 330, 340, in the manner described above, through solenoid drive circuits SLD1, SLD2, SLD3, respectively, connected to the output terminals of the speed change control system ECS1. The speed change control system ECS1, which is constituted by a circuit as disclosed in, e.g., the specification of Japanese Patent Kokai-Publication No. 56-35858, is adapted to compare the measured throttle openig and vehicle speed with programmed patterns and control the opening and closing of the solenoid valves 320, 330, 340 in accordance with the shift position.

The transfer change control system ECS2 comprises a first comparator COM1 the input to which is the output of the vehicle speed sensor S1, a second comparator COM2 the input to which is the output of the throttle sensor S2, a NOR gate circuit NOR-C the inputs to which are the outputs of the two comparators COM1, COM2, a first AND gate AND-C1 the inputs to which are the output of the shift position sensor S3 and the output of the transfer changeover switch S4, and an AND gate circuit AND-C2 the inputs to which are the output of the gate AND-C1 and the output of the NOR gate NOR-C. The output of the AND gate AND-C2 is applied to the solenoid drive circuit SLD4 of the solenoid valve 400. The first comparator COM1 produces a low-level output when the vehicle speed drops below the set value, and the second comparator COM2 produces a low-level output when the opening degree of the throttle drops below the set value. Accordingly, the NOR gate NOR-C produces a high-level output when the outputs from both the first and second converters go low, that is, only when the vehicle speed and throttle opening degree are lower than the respective set values. At all other times the output of the NOR gate NOR-C is at the low level.

The shift position sensor S3 produces a high-level signal when the shift lever (not shown) is in the N range, and the transfer changeover switch S4 is closed at the time of a transfer action, namely when the dog clutches 54, 56 are at changing over, thereby applying a high-level signal to the AND gate AND-C1. Therefore, in case where the shift lever is in the N range provided that, e.g., vehicle speed is zero and the degree of throttle opening is zero, in changing over the dog clutches 54, 56 of the transfer T, the AND gate AND-C2 delivers a high-level signal to the solenoid drive circuit SLD4 to open the solenoid valve 400. Consequently, the spool 412 of the valve 410 is moved to the left, so that line pressure flows into the brake BO through valves 410, 240 (the spool 242 is on the left side when the shift lever is in the N range) and line 1L, thereby engaging the brake BO.

Since line pressure is being introduced to the clutch CO through valve 240 at this time, the clutch CO is in the engaged state. Therefore, brake BO and clutch CO are engaged at the same time, with the result that the planetary gear 24 of the overdrive section 20 is locked. From this point onward, no torque is transmitted. The output shaft 42, meanwhile, is free owing to the one-way clutch F1.

Thus, if the transfer T is changed over when the vehicle speed and throttle opening degree are below the respective set values and the shift lever is in neutral, the output shaft 42 does not rotate and is placed in a free state during the changing-over action. As a result, changeover of the transfer T is facilitated.

Figure 3:
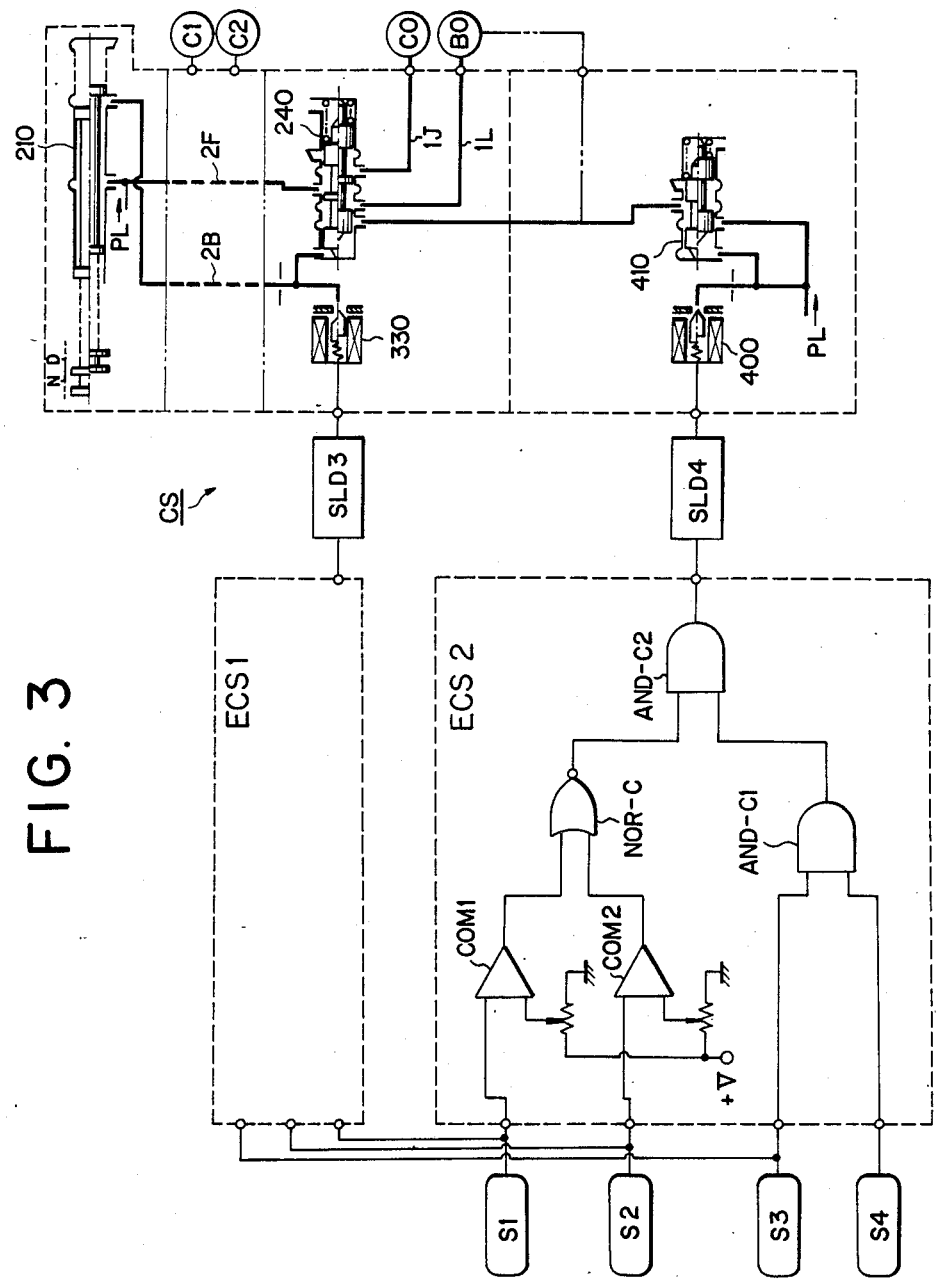
FIG. 3 is a simplified block diagram of a hydraulic circuit shown in FIG. 2.
Figure 4:
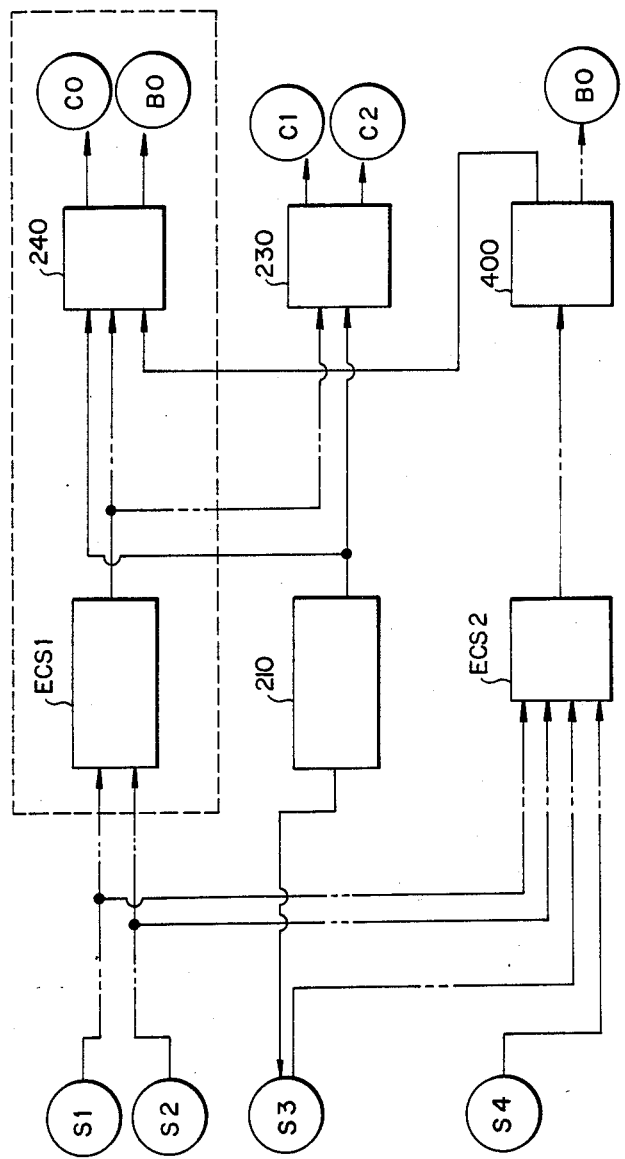
FIG. 4 is a block diagram showing the distinction between electric signal flow and hydraulic signal flow in the control apparatus of FIG. 3.

FIG. 3 is a control apparatus simplified so as to clarify the hydraulic circuitry related to the clutch CO and brake BO in the hydraulic control apparatus HCS shown in FIG. 2B. FIG. 4 is a view useful for differentiating between the flow of electric signals (broken line) and hydraulic pressure signals (solid line) in the control apparatus of FIG. 3.

Figure 5:
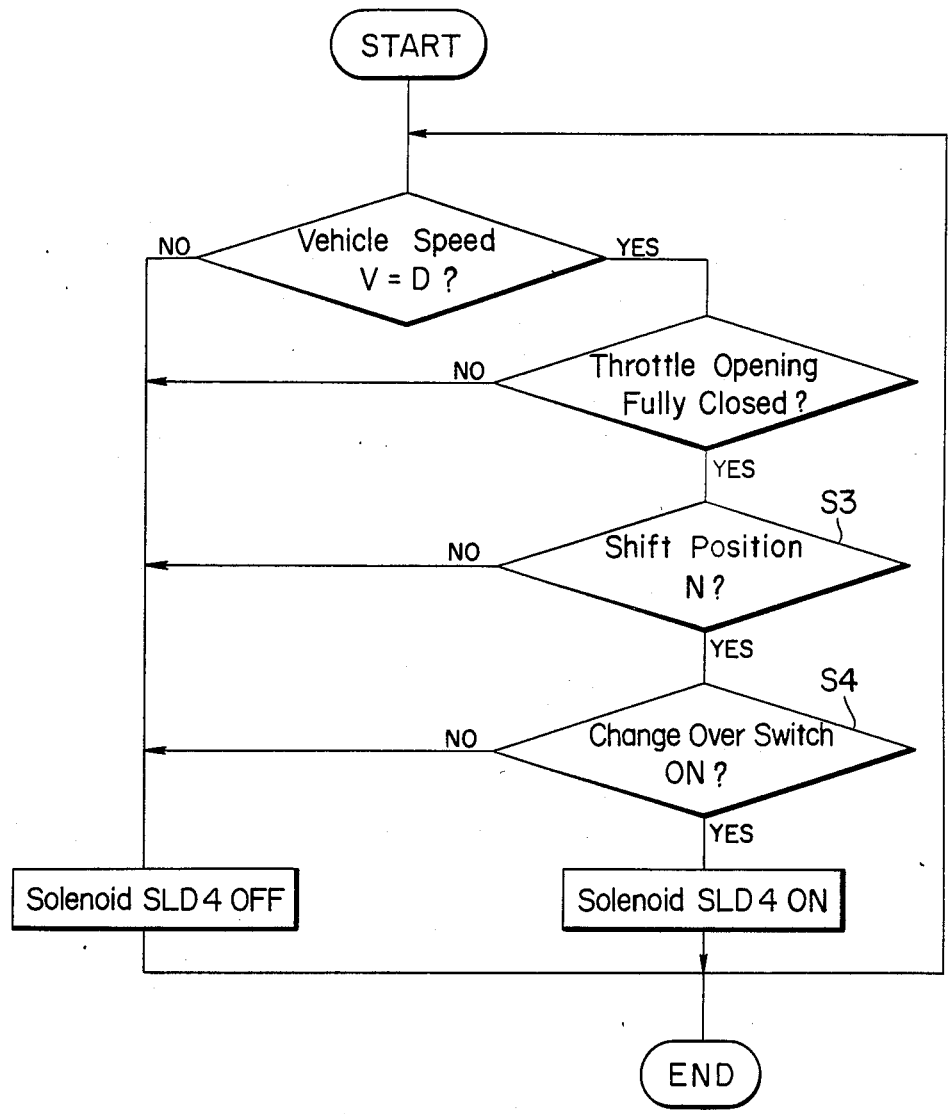
FIG. 5 is a flowchart illustraing an example of a program executed in a transfer shift control system ECS2.

Though the transfer change control system ECS2 as shown in FIG. 2A is composed of comparators and logical circuitry, the entire electrical control apparatus can be realized by a microcomputer which can be made to execute a program, e.g., as illustrated in FIG. 5.

The program includes the steps of:
(a) discriminating whether the shift position is neutral (N),
(b) discriminating whether the changeover switch S4 is ON, and
(c) if both the steps (a) and (b) are YES, providing an output signal indicative of actuating the brake assembly.

The micro-computor may receive further signals each indicative of the vehicle speed and the engine rotation speed, respectively, and said program may further include the steps of:
(d) discriminating whether the vehicle speed is below a first predetermined value,
(e) discrimanating whether the engine rotation speed is below a second predetermined value,
(f) if the steps (d) and (e) are YES, providing an output signal indicative of allowance to the brake assembly actuation, and
(g) providing a logical multiplication of the output signals of the steps (c) and (f).

Figure 6:
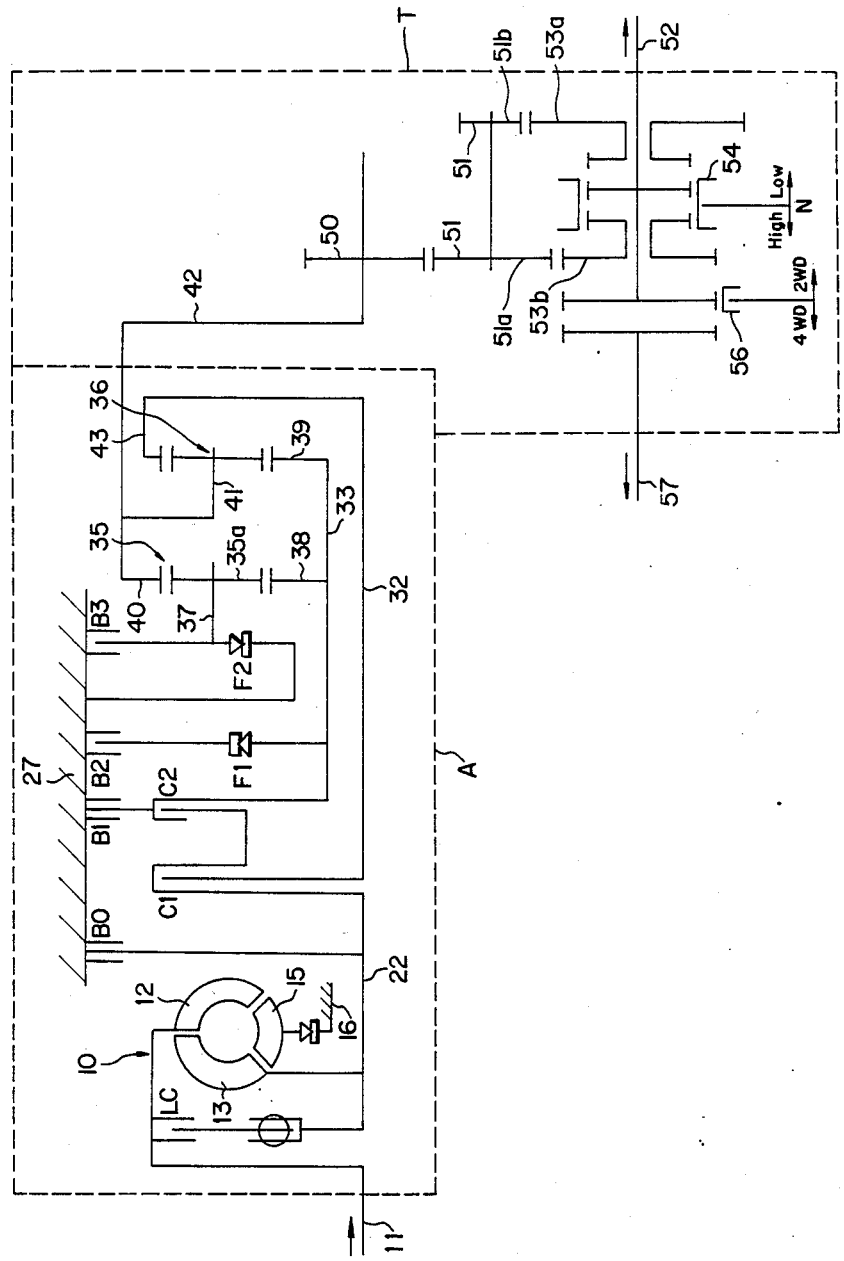
FIG. 6 is a schematic diagram illustraitng another embodiment of the transmission shown in FIG. 1.

FIG. 6 illustrates a second embodiment of a tranmsmission different from the embodiment of FIG. 1. Since this embodiment does not include an overdrive section, the embodiment differs from that of FIG. 1 in that it is constituted by two planetary gear sets. However, both embodiments are similar in that clutch C1 or C2 is released when the transmission is in neutral. Table IV shows the relation between speeds achieved by the transmission of the second embodiment and the states of the various brakes and clutches.

TABLE IV

|   | SPEED | C1 | C2 | B0 | B1 | B2 | B3 |
|---|---|---|---|---|---|---|---|
| P |   |   |   |   |   |   | 0 |
| R |   |   | 0 |   |   |   | 0 |
| N |   |   |   | Δ |   |   |   |
| 3 | 1st | 0 |   |   |   |   |   |
|   | 2nd | 0 |   |   |   | 0 |   |
|   | 3rd | 0 |   |   |   | 0 |   |
| 2 | 1st | 0 |   |   |   |   |   |
|   | 2nd | 0 |   |   | 0 | 0 |   |
| L | 1st | 0 |   |   |   |   | 0 |

Figure 7:
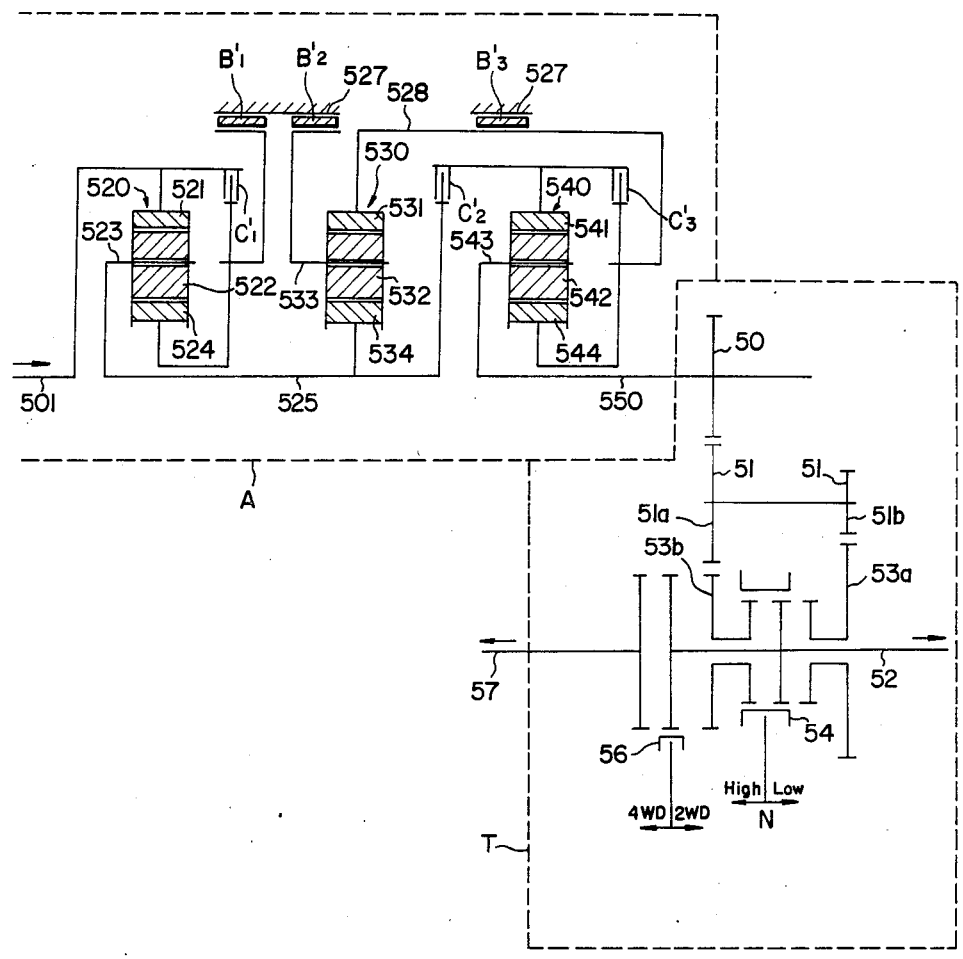
FIG. 7 is a schematic diagram illustrating a third embodiment of the present invention.

FIG. 7 illustrates an embodiment of a transmission in which the first power train (transmission mechanism) in the unit A is composed of three planetary gear sets. An input shaft 501 is connected to a ring gear 521 of a first planetary gear set 520, and a carrier 523 rotatably supporting a pinion gear 522 is connected to a sun gear 534 of a second planetary gear set 530 through an intermediary shaft 525. A clutch C1' is provided between a sun gear 524 and the ring gear 521 of the first set 520, and a band brake B1' is provided between the sun gear and a housing 527.

A band brake B2' is provided between the housing 527 and a carrier 533 rotatably supporting a pinion 532 of the second planetary gear set 530. A ring gear 531 is connected to a sun gear 544 of the third planetary gear set 540 through an arm 528, and a band brake B3' is provided between the arm 528 and the housing 527.

Clutches C2', C3' are provided between a ring gear 541 of the third planetary gear set 540 and the sun gear 534 of the second planetary gear set 530, and between the ring gear 541 and a ring gear 544, respectively. A carrier 543 rotatably supporting a pinion gear 542 is connected to an output shaft 550 coupled to the transfer section T.

Table V shows the relation between the speeds achieved by this transmission mechanism and the states of the brakes and clutches. Brake B1' corresponds to the brake B0 of FIG. 1. The term "change control" in Table V represents the changing-over control for the transfer assembly.

TABLE V

|  | C1' | C2' | C3' | B1' | B2' | B3' |
|---|---|---|---|---|---|---|
| Forward |  |  |  |  |  |  |
| 1st | X | 0 | X | 0 | 0 | X |
| 2nd | 0 | 0 | X | X | 0 | X |
| 3rd | 0 | 0 | X | X | X | 0 |
| 4th | 0 | 0 | 0 | X | X | X |
| Reverse | 0 | X | 0 | X | 0 | X |
| Change Control | 0 | X | X | 0 | X | X |

What is claimed is:

1. An apparatus for controlling a transmission mechanism comprising a power transmission assembly for transmitting power from an engine,
   an input member connected to an output side of the power transmission assembly,
   a first power train operatively connected to the input member and providing at least two different speed-change ratios,
   a second power train communicating with the first power train and including a dog clutch for cutting off and changing over power,
   a brake assembly for locking said input member, and a clutch assembly for operatively engaging and disengaging the input member with said first power train, wherein the apparatus includes means for engaging said brake assembly in response to a signal indicative of changing-over of said second power train when said clutch assembly is in a disengaged state;
   said means for engaging said brake assembly including a control system for controlling said brake assembly and a clutch assembly, the control system including:
   (a) a shift position sensor for sensing the selected shift position of the first power train and providing a signal indicative thereof,
   (b) changing-over sensing means for sensing the changing-over action in the second power train and providing said signal indicative of changing-over of the second power train, and
   (c) a CPU receiving two output signals of the shift position sensor and the changing-over sensing means, and providing an output signal indicative of actuating the brake assembly,
   wherein the CPU executes a program including the steps of:
   (a) discriminating if the shift position is neutral (N),
   (b) discriminating if the changeover switch is ON, and
   (c) if both the steps (a) and (b) are YES, providing an output signal indicative of actuating the brake assembly.

2. The apparatus as defined in claim 1, wherein the CPU receives further signals each indicative of a vehicle speed and the engine rotation speed, respectively, and said program further includes the steps of:
   (d) discriminating if the vehicle speed is below a first predetermined value,
   (e) discriminating if the engine rotation speed is below a second predetermined value,
   (f) if the steps (d) and (e) are YES, providing an output signal indicative of allowance to the brake assembly actuation, and
   (g) providing a logical multiplication of the output signals of the steps (c) and (f).

3. The apparatus as defined in claim 2, wherein the program further includes the steps:
   the step (g) being executed by providing a signal YES to the step (a), and
   when the steps (a), (b), (d) and (e), any of these steps results in NO, providing an output signal indicative of inhibiting the brake assembly actuation.

4. The apparatus as defined in claim 1, wherein said control system further includes:
   (d) a speed change control system, for the first power train, which is also responsive to the signal indicative of the neutral shift position (N) of the first power train and which provides a signal for disengaging the clutch assembly.

5. The apparatus as defined in claim 1, wherein said control system further includes a control system, for said clutch assembly, which serves as a speed change control system for the first power train, the control system being responsive to the signal indicative of the neutral shift position (N) of the first power train to provide a signal for disconnecting the clutch assembly.

6. The apparatus as defined in claim 5, wherein said control system further includes a hydraulic system operating responsive to the signal for disconnecting the clutch assembly.

7. The apparatus as defined in claim 1, wherein said control system further includes a hydraulic control system operating responsive to the output signal indicative of actuating the brake assembly.

* * * * *